(12) United States Patent
Robinson

(10) Patent No.: US 9,739,049 B1
(45) Date of Patent: Aug. 22, 2017

(54) EXPANSION JOINT FOR LONGITUDINAL LOAD TRANSFER

(71) Applicant: Schul International Company, LLC, Pelham, NH (US)

(72) Inventor: Steven R. Robinson, Windham, NH (US)

(73) Assignee: Schul International Company, LLC, Pelham, NH (US)

( * ) Notice: Subject to any disclaimer, the term of this patent is extended or adjusted under 35 U.S.C. 154(b) by 0 days.

(21) Appl. No.: 15/611,160

(22) Filed: Jun. 1, 2017

Related U.S. Application Data

(63) Continuation of application No. 15/046,924, filed on Feb. 18, 2016.

(60) Provisional application No. 62/272,837, filed on Dec. 30, 2015.

(51) Int. Cl.
| | | |
|---|---|---|
| *E04B 1/68* | (2006.01) | |
| *E01D 19/06* | (2006.01) | |
| *E01C 23/02* | (2006.01) | |
| *E04F 15/02* | (2006.01) | |

(52) U.S. Cl.
CPC .......... *E04B 1/6801* (2013.01); *E01C 23/026* (2013.01); *E01D 19/06* (2013.01); *E04F 15/02016* (2013.01)

(58) Field of Classification Search
CPC ........ E04B 1/62; E04B 1/9801; E04B 1/6812; E04B 1/948; E01C 23/026; E01C 23/028; E01D 19/06; E01D 19/005
See application file for complete search history.

(56) References Cited

U.S. PATENT DOCUMENTS

| | | | | |
|---|---|---|---|---|
| 3,604,169 | A * | 9/1971 | Smith .................... | E04B 1/6801 52/287.1 |
| 3,722,379 | A * | 3/1973 | Koester ................. | E01C 11/126 404/68 |
| 4,285,612 | A * | 8/1981 | Betti ....................... | E01C 11/04 14/73.1 |
| 4,699,540 | A * | 10/1987 | Gibbon ................... | E01C 11/10 404/49 |
| 4,927,291 | A * | 5/1990 | Belangie ................. | E01C 11/10 404/64 |
| 5,130,176 | A * | 7/1992 | Baerveldt ................ | B32B 5/32 428/192 |
| 5,335,466 | A * | 8/1994 | Langohr ............... | E04B 1/6801 52/396.04 |
| 5,935,695 | A * | 8/1999 | Baerveldt ............. | E04B 1/6812 277/654 |
| 8,365,495 | B1 * | 2/2013 | Witherspoon .......... | E04B 1/948 404/68 |
| 8,813,450 | B1 * | 8/2014 | Hensley ........................ | 52/317 |
| 9,068,297 | B2 * | 6/2015 | Hensley ................. | E01C 11/14 |
| 9,200,437 | B1 * | 12/2015 | Hensley ............... | E04B 1/6812 |
| 9,206,596 | B1 * | 12/2015 | Robinson ............. | E04B 1/6812 |
| 2008/0172967 | A1 * | 7/2008 | Hilburn .................. | E04B 1/948 52/396.01 |
| 2012/0023846 | A1 * | 2/2012 | Mattox .................. | E04B 1/948 52/232 |

* cited by examiner

*Primary Examiner* — Paola Agudelo
(74) *Attorney, Agent, or Firm* — Crain, Caton & James, P.C.; James E. Hudson, III

(57) ABSTRACT

An expansion joint design for supporting transfer loads. The system includes an elongated core and at least one longitudinal load-transfer member which are bonded together.

19 Claims, 3 Drawing Sheets

EXPANSION JOINT FOR LONGITUDINAL LOAD TRANSFER

CROSS-REFERENCE TO RELATED APPLICATIONS

This application is a continuation of U.S. patent application Ser. No. 15/046,924 for "Expansion Joint for Longitudinal Load Transfer," filed Feb. 18, 2016, which is incorporated herein by reference, and claims priority to U.S. Provisional Patent Application No. 62/272,837, filed Dec. 30, 2015 for "Sealing expansion joint for longitudinal load transfer and method of manufacture," which is incorporated herein by reference.

STATEMENT REGARDING FEDERALLY SPONSORED RESEARCH OR DEVELOPMENT

Not Applicable.

BACKGROUND

Field

The present disclosure relates generally to systems for creating a durable seal between adjacent panels, including those which may be subject to temperature expansion and contraction or mechanical shear. More particularly, the present disclosure is directed to an expansion joint design for supporting transfer loads.

Description of the Related Art

Construction panels come in many different sizes and shapes and may be used for various purposes, including roadways, sideways, and pre-cast structures, particularly buildings. Use of precast concrete panels for interior and exterior walls, ceilings and floors, for example, relationship, forming a lateral gap or joint between adjacent panels to allow for independent movement, such in response to ambient temperature variations within standard operating ranges, building settling or shrinkage and seismic activity. Moreover, these joints are subject to damage over time. Most damage is from vandalism, wear, environmental factors and when the joint movement is greater, the seal may become inflexible, fragile or experience adhesive or cohesive failure. As a result, "long lasting" in the industry refers to a joint likely to be usable for a period greater than the typical lifespan of five (5) years. Various seals have been created in the field.

Various seal systems and configurations have been developed for imposition between these panels to provide seals which provide one or more of fire protection, waterproofing, sound and air insulation. This typically is accomplished with a seal created by imposition of multiple constituents in the joint, such as silicone application, backer bars, and compressible foams.

Expansion joint system designs for situations requiring the support of transfer loads have often required the use of rigid extruded rubber or polymer glands. These systems lack the resiliency and seismic movement required in expansion joints. These systems have been further limited in functioning as a fire resistant barrier, which is often a desired function.

Other systems have incorporated cover plates that span the joint itself, often anchored to the concrete or attached to the expansion joint material and which are expensive to supply and install. Additionally, cover plates that are higher than the deck or substrate level can present a hazard, such as tripping, an unnecessary impediment, such as to wheelchairs. Further, these systems require undesirable mechanical attachment, which requires drilling into the deck or joint substrate. Cover plate systems that are not mechanically attached rely on support or attachment to the expansion joint, thereby subject the expansion joint system to continuous compression, expansion and tension on the bond line when force is applied to the cover plate, which shortens the life of the joint system.

SUMMARY

The present disclosure therefore meets the above needs and overcomes one or more deficiencies in the prior art by providing an expansion joint design for supporting transfer loads. In particular, the present disclosure provides an alternative to the load transfer of an extruded gland or anchored cover plate, and does so without the movement limitations of extruded glands, and without the potential compression set, delamination or de-bonding found in these expansion joints.

The disclosure provides an expansion joint system comprising and elongated core of a resiliently compressible foam and one or more incompressible longitudinal load-transfer members bonded to or integrated into the elongated foam core.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

Figure 1:
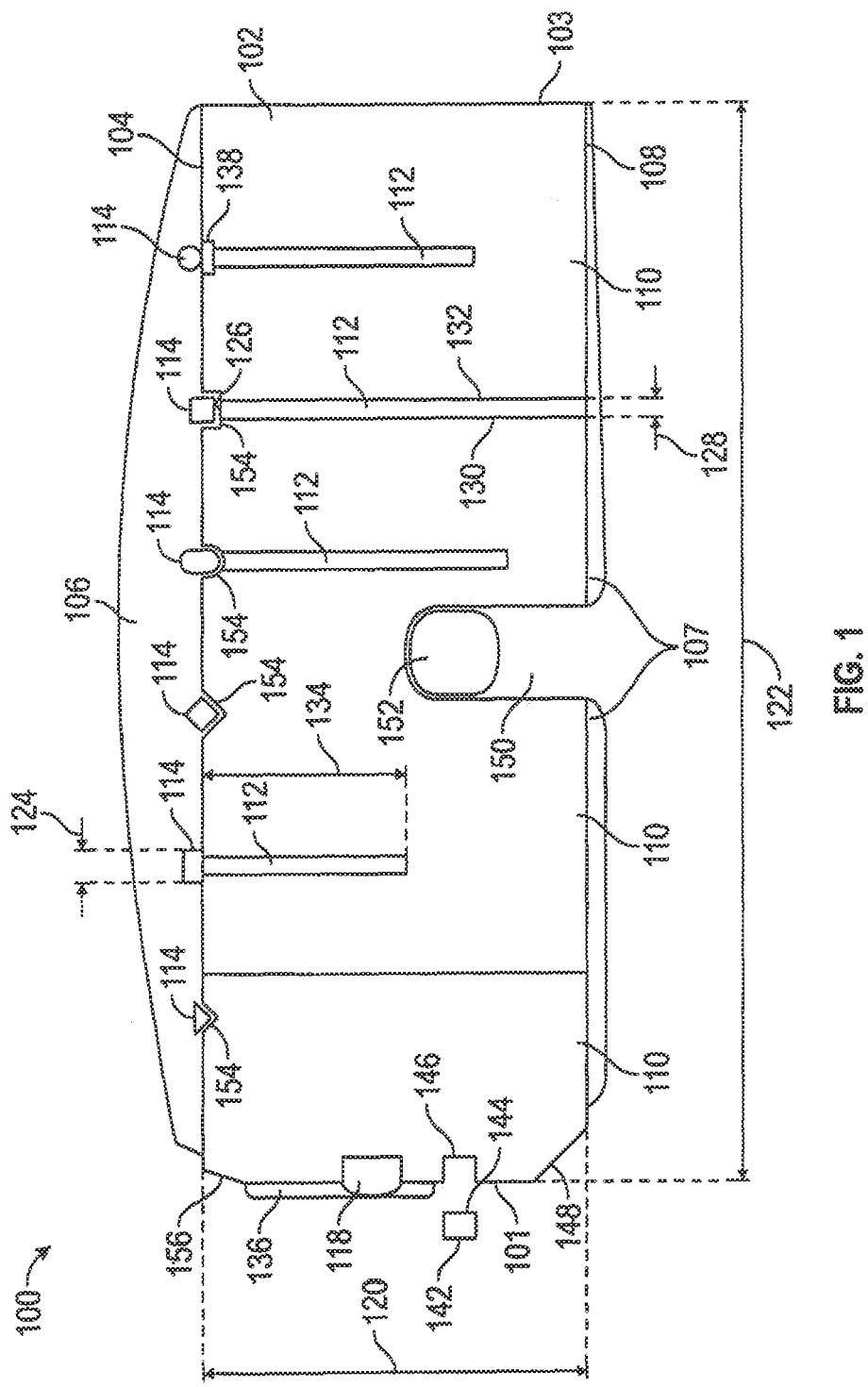
FIG. 1 provides an end view of one embodiment of the present disclosure.

Referring to FIG. 1, an end view of one embodiment of the expansion joint system 100 of the present disclosure is provided. The system 100 includes an elongated core 102 and at least one longitudinal load-transfer member 114 which are bonded together. The system 100 provides an expansion joint system which can be used in standard applications and in exposed, high traffic areas, which is preferably water resistant.

The elongated core 102 is composed of resiliently compressible foam, which may be closed cell or open cell foam, or a combination thereof. The extent of compressibility may be selected based on the need. A higher compression is known to result in higher water resistance, but may create difficulties in installation, and ultimately becomes so compressed as to lack flexibility or further compressibility, such as at a ratio of 5:1. The elongated core 102 may be compressible by 25%, or may compress by 100% or as high as 400% so that the elongated core 102 is one quarter of the elongated core lateral width 122. However, the higher compression ratios negatively affect the functionality of the system 100 by, among other issues, reducing the movement of the system 100 within the joint. As the joint cycles, the actual compression ratio will change, so the optimum ratio should be selected. A 2:1 compression ratio may be used, but preferably not greater than 4:1. Lower compression ratios are desirable, as these allow a full +/−50% movement versus −25%/+35% as found in products in the art. The elongated core 102 includes an elongated core top 104, an elongated core bottom 108, an elongated core first side 101, and an elongated core second side 103. An elongated core height 120 is defined intermediate the elongated core top 104 and the elongated core bottom 108. This core height 120 may be of consistent with heights of systems known in the art, or may be shorter in light of the longitudinal load-transfer member 114, providing a more desirable profile for use in the field. Both the elongated core first side 101 and the elongated core second side 103 are generally perpendicular to the elongated core top 104. An elongated core lateral width 122 is defined intermediate the elongated core first side 101 and the elongated core second side 103. While the core 102 may be composed of a single piece of foam, the core 102 may be formed by lamination of foam members to one another, and/or, when present, to a support member 112.

The longitudinal load-transfer member 114 is incompressible, but may be rigid, semi-rigid or flexible in the vertical plane, i.e. a plane perpendicular to the first plane 308 and perpendicular to the elongated core longitudinal axis 202, to best transfer the load applied to the system 100 across the length of the elongated core 102. The longitudinal load-transfer member 114 is bonded to, or put into, the elongated foam core 102 at the elongated core top 104 and is generally longitudinally co-extensive. The longitudinal load-transfer member 114 has a longitudinal load-transfer member lateral width 124. While one longitudinal load-transfer member 114 may be used, preferably a plurality, such as six, are bonded, in spaced apart positions, to the elongated core 102. The number of longitudinal load-transfer member 114 is selected to provide maximum load transfer and, when desired, fire protection, while not impeding the cycling of the system 100. The longitudinal load-transfer member 114 may be post-tensioned by affixing the end of a longitudinal load-transfer member 114 beyond the end of the core 102 to the adjacent material.

The longitudinal load-transfer member 114 may also be rigid, semi-rigid or flexible in the horizontal plane, i.e the plane parallel to the first plane 308, to restrict bending of the expansion joint core material. This reduces undesirable bending of the system 100 which may cause some surface-bonded or coated intumescent materials to de-bond or de-laminate reducing or eliminating the fire-resistive properties.

The system 100 may further include, when desired, one or more support members 112. Each support member 112 has a support member top 126, a support member thickness 128, a support member first side 130, a support member second side 132, and a support member height 134. The use of the support members 112 support a flatter elongated core top 104 with better distribution of load and provides a lower trip hazard. The support members 112 may be selected from sufficient material known in the art, including carbon fiber, fiberglass reinforced plastic, metal, or a polymer, which may be rigid or semi-flexible or flexible.

The support member thickness 128 is equivalent to, i.e. substantially the same thickness as, the longitudinal load-transfer member lateral width 124 and, when used, the support member 112 is positioned within the core 102, such that a support member top 126 is adjacent a longitudinal load-transfer member 114. The support member may be positioned within a deeper elongated core top slot 154 in the elongated core 102. A core stop slot may be about 0.375 inches or may be substantially more. When desired, the support member 112 may abut the longitudinal load-transfer member 114, or may be joined to it. The load applied to the longitudinal load transfer member 114 is therefore transferred to the support member 112. The support member height 134 is at least half the elongated core height 120, but may be equivalent to, or even equal to, i.e. substantially the same height or even the same height as, the elongated core height 120. While the entirety of the load transferred to the support member 112 may be transferred down to the foam below, or any surface below the system 100, the support member 112 may be bonded to the adjacent core 102 where support member first side 130 and the support member second side 132 contact the foam members 110. This may be accomplished by an adhesive applied to the support member 112. The core 102 may comprise a lamination of several foam members 110 or a core 102 having separations along its body, i.e. slits or incisions, which separate the core 102 among several members 110. These support members 112 may be high durometer rubber or a rigid material, such as plastic or other materials known to those skilled in the art. Each support rod 114 is positioned directly above the support member 112. The shape and composition of the support rod 114 may be selected based on material properties and needs.

Additionally, when desired, an elastomeric coating 106 may be adhered to the elongated core 102 across the elongated core top 104 and atop the longitudinal load-transfer member 114. The elastomeric coating 106 may also be adhered to the elongated core 102 across the elongated core bottom 108. The elastomer coating 106 may also be adhered to the longitudinal load-transfer member 114 when desired. The elastomeric coating 106 may be any desirable material, such as silicone or urethane, and may have characteristics selected for the particular use, such as being fire-rated. The elastomer coating 106 may therefore also contain an intumescent. The elastomer 106 may be applied in strips or as a continuous coating. The elastomeric coating 106 provides the traffic contact point when the system 100 is installed in a joint. The system 100 may be made at least partially symmetrical by also applying an elastomeric coating 107 to the bottom 108 of the core 102.

To better retain the longitudinal load-transfer member 114, the elongated core 102 may include an elongated core top slot 154 in the elongated core top 104, so that a longitudinal load-transfer member 114 may be positioned in the elongated core top slot 154. The elongated core top slot 154 may be any shape, may be selected to match the shape of the longitudinal load-transfer member 114, or may be v-shaped, u-shaped, or rectangular. The shape of the elongated core top slot 154 may be selected to match the cross-sectional shape of the longitudinal load-transfer member 114, which may be any shape, such as rectangular, triangular, or conic. Further, the shape of the longitudinal load-transfer member 114 may be defined by the shape of the elongated core top slot 154, where the longitudinal load-transfer member 114 may be formed in situ, by forming the longitudinal load-transfer member 114 in the elongated core top slot 154 of a hardening material, such as epoxy. Because the elongated core top slot 154 is directly cut into the elongated core 102, a lower quantity of elastomer 106 may be required.

Alternatively, the support rod 114 may be formed by application of a coating, by injection, or by being filled into a profile on the elongated core 102 prior to compression. Alternatively, a graphite-based fire retardant material 138 may be positioned between the support rod 114 and the support member 112. These same support rods 114 and any graphite member 116 may be positioned on the bottom 108 of the elongated core 102 to provide a partial symmetrical body.

Installation and maintenance of the system 100 may be furthered by additional elements. To aid in installation, the elongated core 102 may include an elongated beveled surface 148 adjacent the elongated core bottom 108 and the elongated core first side 101. To increase the sealing property of the system 100, an adhesive coating 136 may be applied to the elongated core 102 on the elongated core first side 101. The elongated beveled surface 148 provides a tapered edge when not compressed to facilitate installation. The gap in the joint occasioned by the lack of contact of the elongated beveled surface 148 and the substrate 302, 304 may be filed with materials selected for bonding, water resistance, and/or fire resistance such as epoxy or intumescent.

Similarly, the system 100 may include a tapered surface on the elongated core first side 101 near the elongated core top 104, which allows for greater profile depth while still providing the desired support.

When further fire retardancy is desired, further elements may be incorporated into the system 100. A graphite-based fire retardant material 138 may be positioned intermediate the longitudinal load-transfer member 114 and the support member 122. Further, a first intumescent member 118 may be adhered to or embedded into the elongated core 102. The first intumescent member 118, such as expanding graphite strips, has a first intumescent member first outer surface 142 and a first intumescent member second outer surface 144. The first intumescent member 118 is adhered to the elongated core 102 at the first intumescent member second outer surface 144. When exposed to increased heat, the first intumescent member 118 expands, providing fire protection to the expansion joint. To provide the fire resistance without impeding the capability of the system 100, the first intumescent member 118 may be embedded in the core. This may be accomplished by providing a first core channel 146 in the elongated core 102 in the elongated core first side 101 along the entire length of the elongated core 102. More than one first intumescent member 118 may be utilized on a side.

Further, an elongated core channel 150 may be included in the elongated core 102 at the elongated core bottom 108, which may first provide aid in compression of the core 102, and which may include an intumescent and/or a hydrophilic rod 152 to provide water resistance, within it. The intumescent and/or a hydrophilic rod 152 may be provided using methods known in the art, including by providing a solid material into the elongated core channel 150, by injecting a liquid material or by a creating a hollow intumescent and/or a hydrophilic rod 152 by coating the interior of the elongated core channel 150. The elongated core channel 150 extending upward into elongated core 102 created by the elongated core channel 150 does not extend substantially into the elongated core 102, and provides a relieved inside section allowing for greater movement and for easier installation. This elongated core channel 150 reduces cross-section tension and compressive resistance.

The elongated core 102 may be treated with fire retardant additives, by methods known in the art, such as infusion, impregnation and coating. Adhesives 136, elastomers 106, the longitudinal load-transfer members 114, and the support members 112 may likewise be selected to provide fire retardancy characteristics. The longitudinal load-transfer members 114 and/or and the support members 112 may be constructed of intumescent materials.

Figure 2:
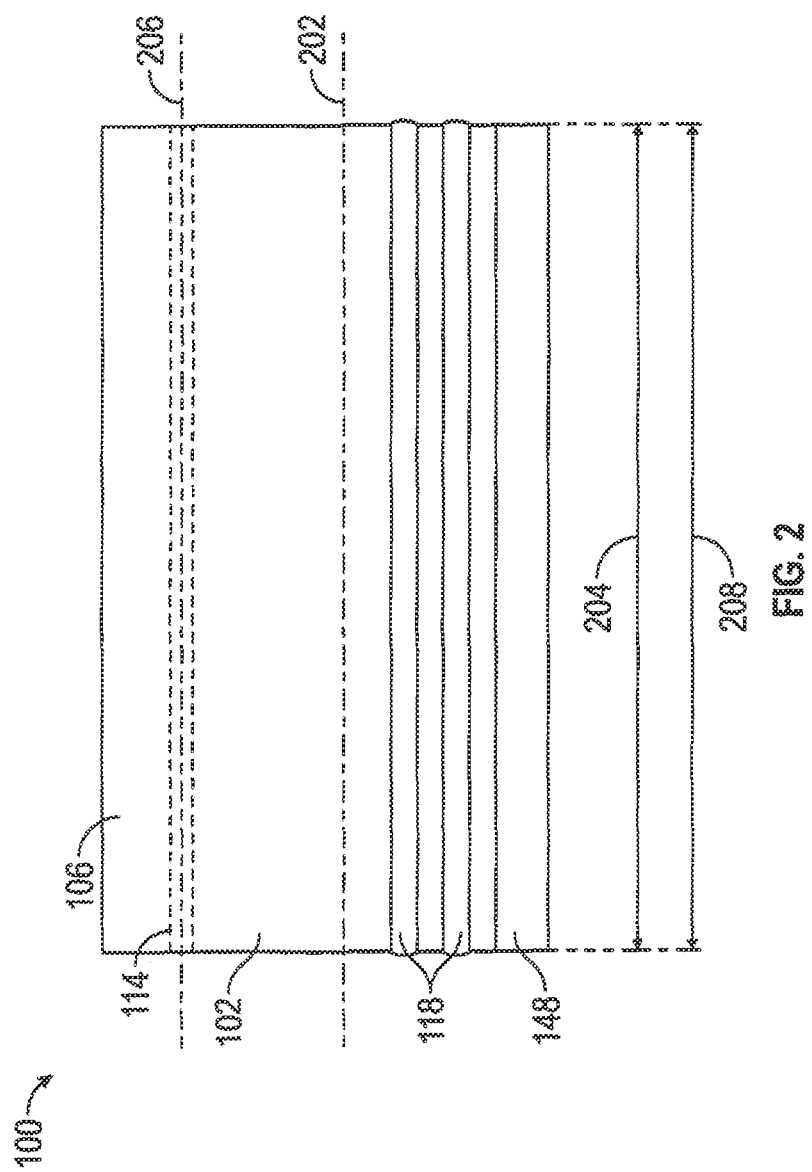
FIG. 2 provides a side view of one embodiment of the present disclosure.

Referring to FIG. 2, a side view of one embodiment of the present disclosure is provided. The various components of the system 100 are generally co-extensive. The elongated core 102 has an elongated core longitudinal axis 202 and the longitudinal load-transfer member 114 has a longitudinal load-transfer member axis 206. The elongated core longitudinal axis 202 and the longitudinal load-transfer member axis 206 are parallel. The elongated core 102 has an elongated core longitudinal length 204 and the longitudinal load-transfer member 114 has a longitudinal load-transfer member length 208. The elongated core longitudinal length 204 and the longitudinal load-transfer member length 208 are equivalent, i.e. substantially the same. Similarly, the first intumescent member 118 has a first intumescent member length equivalent to, i.e. substantially the same as, the elongated core longitudinal length 204 and the longitudinal load-transfer member length 208. Likewise, the intumescent 152 in the elongated core channel 150 and the support member 112 may be sized to be equivalent, i.e. substantially the same as, in length to the core length 204. Alternatively, any of the support member 112, the intumescent member 118, and the intumescent 152 in the elongated core channel 150 may be of length less than core length 204, and may be composed of short, spaced apart segments. The intumescent members 118 thus provide protection with spaced reaction time based on the actual time-temperature exposure required.

Figure 3:
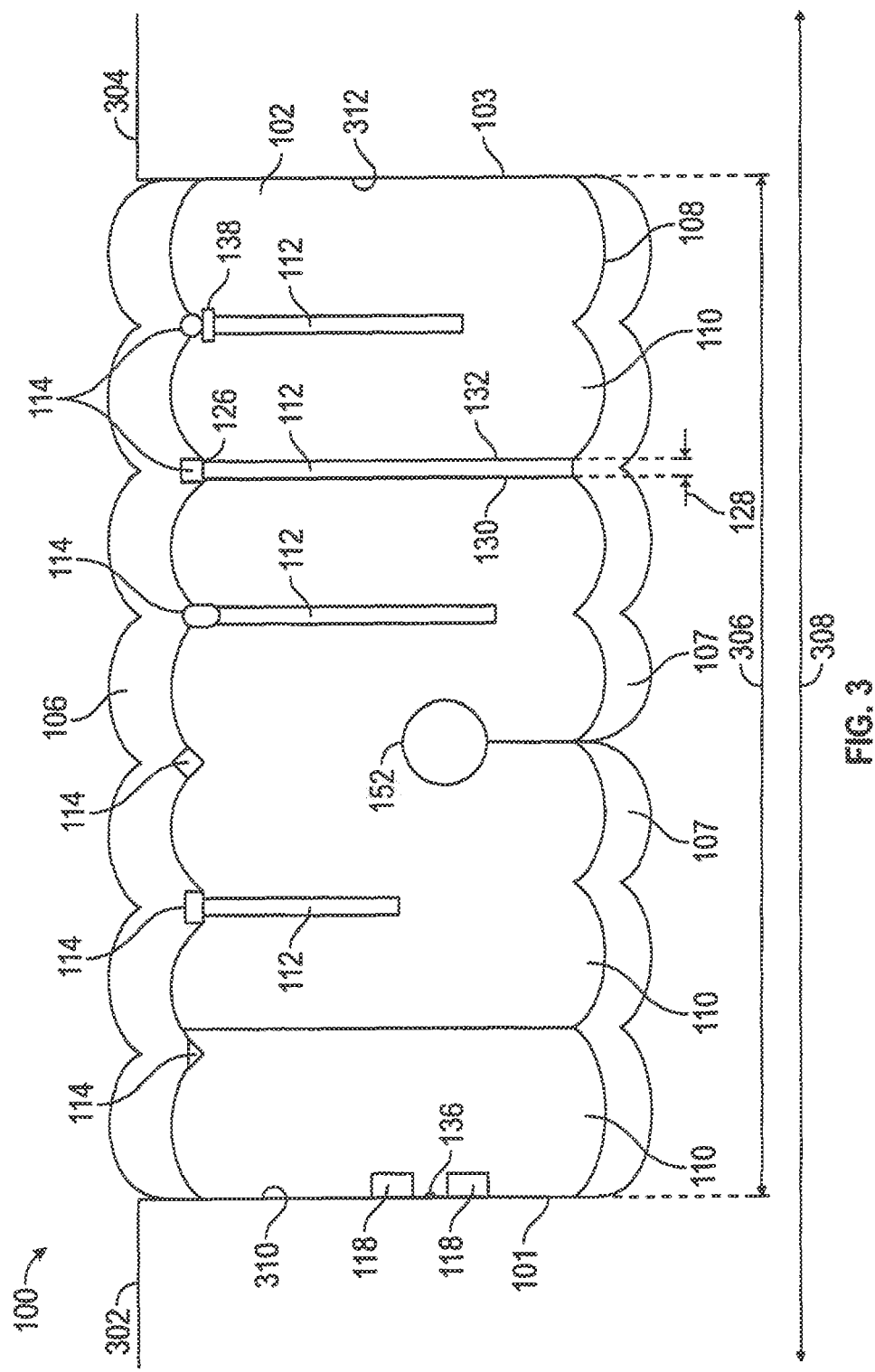
FIG. 3 provides an end view of one embodiment of the present disclosure after imposition between substrates.

Referring to FIG. 3, an end view of one embodiment of the expansion joint system 100 of the present disclosure after imposition between substrates is provided. The system 100 is intended for imposition under compression between a first substrate 302 and a second substrate 304. The first substrate 302 and the second substrate 304 are substantially co-planar with a first plane 308 and the first substrate 302 is distant the second substrate 304 by a first distance 306. Each of the substrates 302, 304 present a face 310, 312 perpendicular to the first plane 308, against which the system 100 applies force. The longitudinal load-transfer member lateral width 124 is not more than one-fourth the first distance 306. When installed, the system 100 takes on a bellows profile such that the longitudinal load-transfer members 114 are found in, or below, each valley. The valley may be of any depth, and may be one-half inch in depth. The longitudinal load-transfer members may be imposed below the elongated top core 104 when desired. Similarly, the elongated core top 104 may be sculpted to present a bellows profile before installation to better promote the bellows profile after installation. To provide a uniform bellows profile, when the elongated core 102 is formed of a plurality of foam members 110, each of the foam members 110 may be of uniform width. The bellows profile may be generated by the application of the elastomer 106. Alternatively, the width of a foam member 110 may be selected so the system 100 provides the support rods 114, and the associated support members 112, are concentrated at the traffic point of contact. As a result, the width of ribs, the width of the foam member 110 may be 0.375 inches each, but may be substantially thinner, such as 0.125 inches, or substantially more, such as 0.5 inches. As a result, the system 100 allows for the necessary movement associated with the joint, i.e. full movement, without restricting expansion and contraction. This may be, for example, a minimum 50% movement. Beneficially, the structure of the present disclosure may provide a bellows profile with a flatter top on the exposed surface in comparison to the prior art, which presents a rounded, profile with a peak of crown and tapered edges.

The shallower depth afforded from the supporting rods 114 permits use in fire rated applications where quick initial intumescent protection is required. The bellows profile may provide a thinner system 100, which provides the further benefit of a lighter weight. Unlike comparable systems which lack the supporting rods 114 and which are rated for movement of −25%/+35% without a cover plate in wide joints, the present disclosure provides a system capable of +/−50% in wider joints.

Upon insertion and initial expansion of the system 100 into a joint in the field, the adhesive 136 bonds to the adjacent joint substrate 302, 304. The adhesive 136 remains intact and bonded until the intumescent members 118 react to heat and expand. The adhesive 136 provides a necessary function as the lack of bonding between the system 100 and the joint substrate 302, 304 and about each intumescent members 118 will permit the system 100 to be pushed away from the joint substrate 302, 304 upon activation of an intumescent members 118, exposing the substrate 302, 304 and undesirably allowing hot gas to flame to penetrate into the joint.

The present invention provides a high density linear support profile at its top. The elastomer 106 and the profile shape of the core 102 increases the compression force on the foam at the point of contact. Preferably, the compression is in the ratio original to final of 2:1 to 4.5:1. As illustrated, the present disclosure provides a flatter top on the exposed surface compared to the typical bellow profile, which is rounded and has a peak or crown with tapered edges, presenting a tapered surface 156. A tapered surface 156, adjacent the elongated core first side 101 and the elongated core top 104, allows for greater profile depth while still providing the desired support function. From testing, a profile depth of 0.125 to 0.5 inches provides the desired results.

The composite of the core 102, which readily expands and compresses laterally in response to movement by the adjacent substrates, and the longitudinal load-transfer members 114, which add resistive force to a top loaded weight by distributing the load through tension and concentrated mass to the core, produces an expansion joint system which can have less deflection and can handle transfer loads unlike typical pre-compressed or compressible foam expansion joints and thereby provides a greater range of joint size and movement than has been previously possible without a traditional cover plate.

In operation, the system 100 provides a resistive force to the top loaded weight by distributing the load over a wider area through the bonded support material to provide a secondary wear surface for the expansion joint.

The system 100 may be supplied in continuous lengths equal to the length of the installation joint or alternatively in shorter segments, with or without alternating or overlapping strips or rods to be adhesively bonded in place with the same material that is used to attached to the expansion joint core or if in contact with the substrate embed in the adhesive or intumescent or regular epoxy. Precut lengths equal to the desired installation joint are desirable at joints are eliminated as splicing is eliminated, but this may not be possible. However, multiple systems 100 may be joined together to provide for longer lengths.

Additional sections of the longitudinal load-transfer member 114 and/or the support member 112 can be attached in the field to provide a complete union at splices between factory supplied lengths of the invention. While the elastomer and foam, being softer, are subject to indentation compression from being rolled prior to installation, the support rods 114 offset this tendency, and therefore permit wider joints with greater movement without the need of a cover plate. Systems known in the art, for example, must address the difficulty of a regular joint with a thick silicone coating having a lower indentation recovery and being more easily compressed downward into the joint.

Where manufactured by coating a thicker longitudinal material, the thicker longitudinal material can be coated and supplied in one or more lengths or as a single unit. Where manufactured by injection, the material will be injected in a precise, longitudinal line/area in one or more lengths or rolls. The preferred method of injection of rigid thermoplastic materials is with a CNC controlled device such as a commercially available Statasys Dimension BST 3D printer head or other 2D or 3D controlled device to allow for uniform and repeatable injection depths and speed of thermoplastic and other materials injected materials. The use of the CNC controlled injection into the foam core and onto the profile foam surface 3D printing is not limited to the rigid or thermoplastic longitudinal support materials but can use the same type of 3D printing system and a different dispensing head or using a CNC controlled dispensing head to uniformly coat or inject the functional adhesive or sealant at a precise thickness or depth. It has been found that variations in application from lot to lot will yield variable results in the strength and compressibility of the foam core. The invention is not limited in this regard as adhesive, bonding agents and sealants used in the system can be applied manually or by other suitable method. CNC precision is preferred in this application as it provides more consistent results. In the case of filling the expansion joint, the core material would be cut or profiled, typically by a 3D CNC foam cutting machine such that there would be longitudinal valleys or reservoirs that, at specific widths, and depths would be filled with a rigid or semi-rigid support material. The foam core profile can also be cut by manual or other methods without varying from the spirit of this invention. Alternatively, any combination of coating or filling can include an additional support material such a carbon fiber, fiberglass reinforced plastic strips, metal or other type of cable (preferably non-corrosive or rustproof) or a rigid or semi-flexible or flexible polymer rod. The space and thickness is determined by the joint width and movement requirements.

The present disclosure provided advantages over the prior art. The disclosure provides for load transfer without a cover plate attached to the substrate or expansion joint.

Beneficially, the present disclosure does so with lower associated costs and without the limitations that plague the prior art.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

I claim:

1. An expansion joint system for imposition under compression between a first substrate and a second substrate, the first substrate and the second substrate being substantially co-planar with a first plane, the first substrate being distant the second substrate by a first distance, comprising:
  an elongated core,
  the elongated core composed of a resiliently compressible foam,
  the elongated core having an elongated core longitudinal axis,
  the elongated core having an elongated core longitudinal length,
  the elongated core having an elongated core top,
  the elongated core having an elongated core bottom,
  the elongated core having an elongated core height intermediate the elongated core top and the elongated core bottom,
  the elongated core having an elongated core first side,
  the elongated core first side being generally perpendicular to the elongated core top,
  the elongated core having an elongated core second side,
  the elongated core second side being generally perpendicular to the elongated core top;
  the elongated core having an elongated core lateral width,
  the elongated core lateral width configured to be greater than the first distance prior to imposition, and
  at least one longitudinal load-transfer member,
  the at least one longitudinal load-transfer member being incompressible,
  the at least one longitudinal load-transfer member having a longitudinal load-transfer member axis,
  the elongated core longitudinal axis and the longitudinal load-transfer member axis being parallel,
  the at least one longitudinal load-transfer member having longitudinal load-transfer member length,
  the elongated core longitudinal length and longitudinal load-transfer member length being equivalent, the at least one longitudinal load-transfer member bonded to the elongated foam core at the elongated core top, the at least one longitudinal load-transfer member having a longitudinal load-transfer member lateral width,
  wherein the longitudinal load-transfer member lateral width is not more than one-fourth the first distance; and
  wherein the at least one longitudinal load-transfer member is proximate a middlemost portion of the elongated foam core between the elongated core first side and the elongated core second side.

2. The expansion joint system of claim 1, wherein the at least one longitudinal load-transfer member resists bending of the elongated foam core at the elongated core top without debonding.

3. The expansion joint system of claim 1, wherein the at least one longitudinal load-transfer member and the elongated foam core resist delamination.

4. The expansion joint system of claim 1, wherein the at least one longitudinal load-transfer member and the elongated foam core comprise a lamination.

5. The expansion joint system of claim 1, wherein the at least one longitudinal load-transfer member transfers loads to the elongated foam core at the elongated core top without debonding.

6. The expansion joint system of claim 1, wherein the at least one longitudinal load-transfer member is rigid in a plane perpendicular to the first plane and perpendicular to the elongated core longitudinal axis.

7. The expansion joint system of claim 1, wherein the at least one longitudinal load-transfer member is flexible in a plane perpendicular to the first plane and perpendicular to the elongated core longitudinal axis.

8. The expansion joint system of claim 7, wherein the at least one longitudinal load-transfer member is rigid in a plane parallel to the first plane.

9. The expansion joint system of claim 1, wherein the at least one longitudinal load-transfer member is rigid in a plane parallel to the first plane.

10. The expansion joint system of claim 1 wherein the elongated core comprises a plurality of members laminated together.

11. An expansion joint system for imposition under compression between a first substrate and a second substrate, the first substrate and the second substrate being substantially co-planar with a first plane, the first substrate being distant the second substrate by a first distance, comprising:
  an elongated core,
  the elongated core composed of a resiliently compressible foam,
  the elongated core having an elongated core longitudinal axis,
  the elongated core having an elongated core longitudinal length,
  the elongated core having an elongated core top,
  the elongated core having an elongated core bottom,
  the elongated core having an elongated core height intermediate the elongated core top and the elongated core bottom,
  the elongated core having an elongated core first side,
  the elongated core first side being generally perpendicular to the elongated core top,
  the elongated core having an elongated core second side,
  the elongated core second side bring generally perpendicular to the elongated core top;
  the elongated core having an elongated core lateral width,
  the elongated core lateral width configured to be greater than the first distance prior to imposition, and
  at least six longitudinal load-transfer members,
  each of the at least six longitudinal load-transfer members being incompressible,
  each of the at least six longitudinal load-transfer members having a longitudinal load-transfer member axis,
  the elongated core longitudinal axis and the longitudinal load-transfer member axis of each of the at least six longitudinal load-transfer members being parallel,
  each of the at least six longitudinal load-transfer members having a longitudinal load-transfer member length,
  the elongated core longitudinal length and the longitudinal load-transfer member length of each of the at least six longitudinal load-transfer members being equivalent,
  each of the at least six longitudinal load-transfer members bonded to the elongated foam core at the elongated core top,
  each of the at least six longitudinal load-transfer members having a longitudinal load-transfer member lateral width,
  wherein the longitudinal load-transfer member lateral width of each of the at least six longitudinal load-transfer members is not more than one-fourth the first distance.

12. The expansion joint system of claim 1, wherein
  the elongated core includes an elongated core top slot in the elongated core top, and
  wherein the at least one longitudinal load-transfer member is positioned in the elongated core top slot.

13. An expansion joint system for imposition under compression between a first substrate and a second substrate, the first substrate and the second substrate being substantially co-planar with a first plane, the first substrate being distant the second substrate by a first distance, comprising:
  an elongated core,
    the elongated core composed of a resiliently compressible foam,
    the elongated core having an elongated core longitudinal axis,
    the elongated core having an elongated core longitudinal length,
    the elongated core having an elongated core top,
    the elongated core having an elongated core bottom,
    the elongated core having an elongated core height intermediate the elongated core top and the elongated core bottom,
    the elongated core having an elongated core first side,
    the elongated core first side being generally perpendicular to the elongated core top,
    the elongated core having an elongated core second side,
    the elongated core second side being generally perpendicular to the elongated core top;
    the elongated core having an elongated core lateral width,
    the elongated core lateral width configured to be greater than the first distance prior to imposition, and
  three longitudinal load-transfer members,
    each of the three longitudinal load-transfer members being incompressible,
    each of the three longitudinal load-transfer members having a longitudinal load-transfer member axis,
    each of the elongated core longitudinal axes and the longitudinal load-transfer member axes being parallel,
    each of the three longitudinal load-transfer members having a longitudinal load-transfer member length,
    each of the three longitudinal load-transfer members bonded to the elongated foam core at the elongated core top,
    each of the three longitudinal load-transfer members spaced apart between the elongated core first side and the elongated core second side, each of the three longitudinal load-transfer members having a longitudinal load-transfer member lateral width,
    wherein the longitudinal load-transfer member lateral width is not more than one-fourth the first distance.

14. The expansion joint system of claim 13 wherein a first of the three longitudinal load-transfer members and a third of the three longitudinal load-transfer members are equivalently distant from a second of the three longitudinal load-transfer members.

15. The expansion joint system of claim 13, wherein the at least one longitudinal load-transfer member is proximate a middlemost portion of the elongated foam core between the elongated core first side and the elongated core second side.

16. The expansion joint system of claim 13, wherein the at least one longitudinal load-transfer member resists bending of the elongated foam core at the elongated core top without debonding.

17. The expansion joint system of claim 13, wherein the at least one longitudinal load-transfer member and the elongated foam core resist delamination.

18. The expansion joint system of claim 13, wherein the at least one longitudinal load-transfer member and the elongated foam core comprise a lamination.

19. The expansion joint system of claim 13, wherein the at least one longitudinal load-transfer member transfers loads to the elongated foam core at the elongated core top without debonding.

* * * * *